United States Patent
Reynolds et al.

(10) Patent No.: US 6,261,040 B1
(45) Date of Patent: Jul. 17, 2001

(54) SELF-TAPPING FASTENER

(75) Inventors: John R. Reynolds, South Dartmouth, MA (US); Alan Pritchard, Walchwil (CH)

(73) Assignee: Conti Fasteners AG (CH)

(*) Notice: Subject to any disclaimer, the term of this patent is extended or adjusted under 35 U.S.C. 154(b) by 0 days.

(21) Appl. No.: 09/560,773

(22) Filed: Apr. 28, 2000

Related U.S. Application Data (62) Division of application No. 09/236,815, filed on Jan. 25, 1999.

(51) Int. Cl.[7] .............................. F16B 25/00; F16B 35/04
(52) U.S. Cl. ......................... 411/416; 411/386; 411/411; 411/426
(58) Field of Search .................................. 411/386, 411, 411/416, 424, 426

(56) References Cited

U.S. PATENT DOCUMENTS

| | | | |
|---|---|---|---|
| 2,111,046 | 3/1938 | Friedman | ............................ 470/191 |
| 2,250,043 | 7/1941 | Wintle | .................................... 470/16 |
| 2,621,344 | 12/1952 | Friedman | ............................ 470/191 |
| 3,246,556 | 4/1966 | Phipard, Jr. . | |
| 3,263,473 | 8/1966 | Phipard, Jr. . | |
| 3,384,911 | 5/1968 | Carlson | .................................. 470/16 |
| 3,681,963 | 8/1972 | Muenchinger . | |
| 3,803,889 | 4/1974 | Muenchinger . | |
| 3,850,074 | 11/1974 | Simons . | |
| 3,918,345 | 11/1975 | Phipard, Jr. . | |
| 3,978,760 | 9/1976 | Muenchinger . | |
| 4,040,328 | 8/1977 | Muenchinger . | |
| 4,042,342 | 8/1977 | Muenchinger . | |
| 4,194,430 | 3/1980 | Muenchinger . | |
| 4,315,340 | 2/1982 | Veldman . | |
| 5,211,048 | 5/1993 | Takahura et al. | ................... 470/191 |

FOREIGN PATENT DOCUMENTS

| | | |
|---|---|---|
| 2428136 | 1/1976 | (DE) . |
| 3046692 | 9/1982 | (DE) . |

*Primary Examiner*—Neill Wilson
(74) *Attorney, Agent, or Firm*—Cesari and McKenna, LLP; William A. Loginov (57) ABSTRACT

A self-tapping fastener is provided. The fastener is formed from a blank having an odd number of lobes along a cross section taken perpendicular to its axis of rotation. The lobes define a relatively high out-of-round cross section along a tapered thread-forming zone, and a relatively low out-of-round cross section along the main body taken in a direction toward the drive head. Between the main body and tapered thread-forming zone is located an additional thread forming zone having an axial length of approximately one thread pitch and a cross section that conforms to the high out-of-round of the tapered zone. The maximum diameter (at the lobes) of the additional thread-forming section approximately matches that of the full-diameter main body section. A lower-diameter stabilizing section can be provided ahead of the tapered zone, adjacent the tip of the fastener.

7 Claims, 6 Drawing Sheets

(PRIOR ART)

Fig. 5

(PRIOR ART)

SELF-TAPPING FASTENER

RELATED APPLICATION

This is a divisional of co-pending U.S. patent application Ser. No. 09/236,815 filed Jan. 25, 1999.

FIELD OF THE INVENTION

This invention relates to threaded fasteners and more particularly to self-tapping fasteners that form internal threads using a roll-forming process.

BACKGROUND OF THE INVENTION

Self-tapping fasteners that form threads by deforming a thread pattern within a pilot hole have become increasingly popular. There are many advantages to using a roll-forming thread, rather than a more-traditional thread-cutting design. A very successful style of roll-forming thread is the multiple-lobed fastener shown, for example, in Phipard, U.S. Pat. Nos. 3,195,156 and 3,918,345, the contents of which are incorporated herein by reference. This fastener is available from a variety of sources carrying the trademark TRILOBULAR, in connection with a three-lobe thread-forming blank design.

FIGS. 1–5 illustrate a conventional three-lobed thread-forming blank 10 and resulting fastener (21) according to the prior art. In manufacturing a threaded fastener, a blank 10 is first provided with a head 12 as detailed. The head, 12 in this example is a standard hex washer head design. However any head formation enabling the driving of the fastener in a rotary fashion about a central axis 14 can be formed. The head is formed by striking the end of a straight blank "wire" segment using header punches that forcibly deform one end of a metallic wire made of steel or another hard metal. As will be described further a header die deforms a specialized tapered thread-forming and stabilizing section on the opposite end (the "tip") of the shaft. The wire, at the time of head and tip formation, typically already has a lobular cross-section 16 as revealed in FIG. 3. Each lobe 18 is, in essence, an "out-of-round" formation. In other words, the lobes present an eccentric cross section with respect to an otherwise round shape. In fact, formation of the blank, prior to heading involves the drawing of a round-cross-section wire through a lobed female die to create the illustrated out-of-round on the main body of the blank (10). The headed blank 10 is passed between a pair of forming dies to form thereon a set of external threads 22 detailed generally in FIG. 4. These threads exhibit the out-of-round characteristics of the blank. In general, the external apices 24 of each thread are located at an outer diameter greater than that of the original blank, since material has been displaced from the thread troughs 26 outwardly at predetermined locations to form each apex.

All threads have a characteristic pitch and diameter. Because of the lobulation of the threads, the radial offset from the axis 14 will vary about the circumference. In general, standard thread diameters and pitches are provided to lobular fasteners, but the lobes tend to have a slightly larger diameter than a standard thread diameter. This enables the lobes to positively form corresponding internal threads as the fastener is driven into an appropriately-sized pilot hole into the shape of conforming internal threads.

Figure 1:
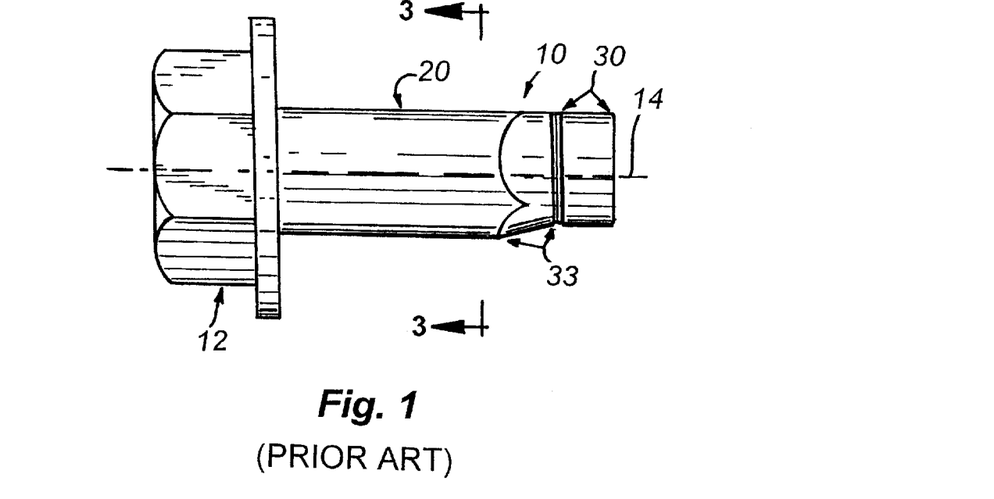
FIG. 1, already described, is a side view of a self-tapping roll-forming fastener blank according to the prior art.
Figure 2:
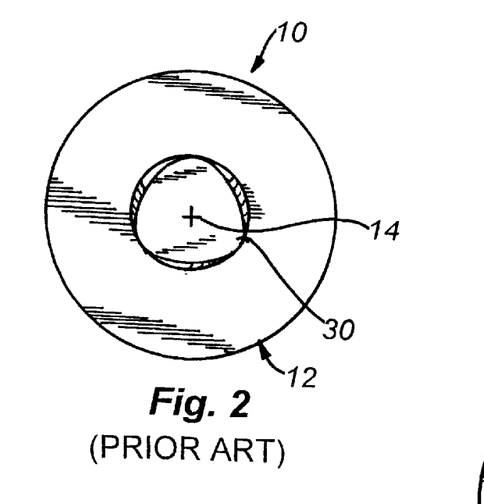
FIG. 2, already described, is a front-end view of the fastener of FIG. 1.
Figure 3:
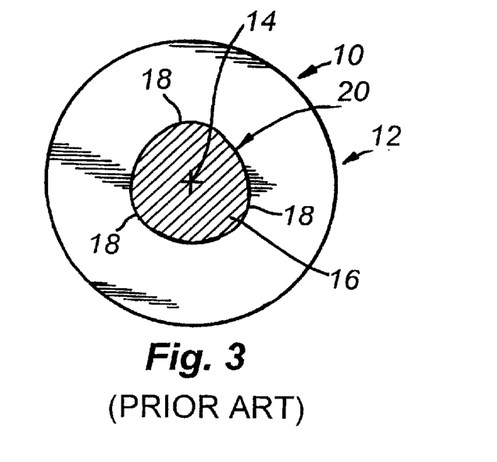
FIG. 3, already described, is a cross-section of the fastener blank taken along line 3—3 of FIG. 1.
Figure 4:
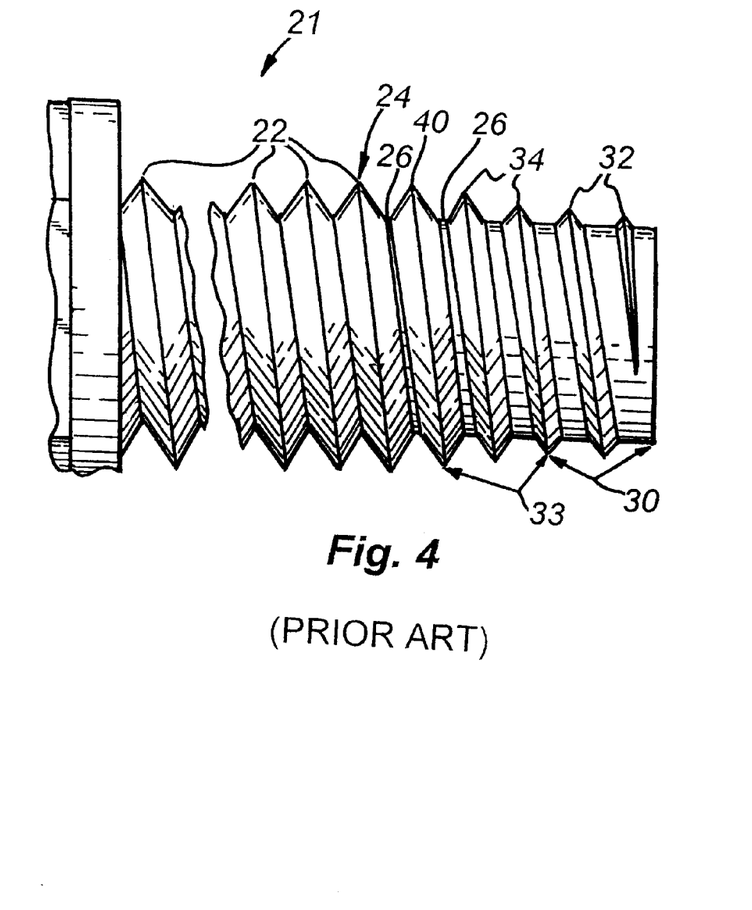
FIG. 4, already described, is a broken side view of an exemplary thread pattern formed from the blank of FIG. 1.

In other words, as the fastener 21 (FIGS. 4 and 5) is rotated clockwise, the lobes engage the inner wall of the pilot hole (not shown) and begin to displace material within the pilot hole. The threaded fastener 21 is provided with a discrete stabilizing zone 30 having stabilizing threads 32, and a thread-forming zone 33 with corresponding thread-forming threads 34. The stabilizing zone 30, as detailed in FIGS. 1 and 2, has a reduced diameter, enabling it to fit within an untapped pilot hole in a relatively perpendicular fashion. The thread-forming zone 33 has a sloped/tapered shape with diameter that increases linearly between the stabilizing zone and the full-diameter main body 20. Note that the thread stabilizing zone 30 has a higher out-of-round than the main body 20. This is clear from the end-on view of FIG. 2. The thread forming zone 33 also has a higher out-of-round than the full-diameter main body 20. In one example, the out-of-round of the thread forming zone gradually tapers back from the highest out-of-round adjacent to the stabilizing zone toward the lower out-of-round that defines the full-diameter main body 20. In another, usually preferred example, the thread forming zone can define an approximately constant-profile high out-of-round along its entire axial length, that transitions stepwise at the main body into the characteristic lower out-of-round. In connection with either example, note the difference between the high out-of-round at the stabilizing section end (FIG. 2) and at the main body cross section (FIG. 3).

As a fastener is driven into an untapped pilot hole, the thread-forming threads 34 encounter the sidewalls of the hole initially. These threads exhibit an increasing outer diameter and higher out-of-round. As such, the lobes are able to gradually apply increasing thread-forming pressure to the pilot hole until each formed internal thread is contacted by the first full-diameter thread 40. This first full-diameter thread 40 has the out-of-round profile of the rest of the main body. It provides the final formation of each thread in the pilot hole to the desired shape.

In general, to form a thread properly requires several swaging "blows" from the underlying lobes of the fastener. This process is, in essence, similar to the formation of a shape in a ductile metal by a blacksmith's hammer. A sufficient number of forming threads is necessary to complete the process. To make the process go more quickly, a high out-of-round, which concentrates the force of the blows is desirable. Use of a high out-of-round within the main, full-diameter threads substantially reduces the amount of torque that must be applied to form threads. However, this lower torque comes at a price, since it results in less diametrical material remaining in contact with the internal thread once it is formed. Hence, it is more likely that failure will occur in such a fastener system. Such failure, in general, results from axial pull-out or, when thicker nut members are used, fracture. Also, since area varies by the square of the radius, the use of a higher out-of-round cross section results in a significantly reduced cross sectional area, which lowers the screw's failure limit. Hence, self-tapping screws typically use an out-of-round dimension that is a compromise between the optimum value for thread forming efficiency and the optimum for resistance to failure.

Previous attempts to balance a desire for higher out-of-round, versus failure resistance is described in U.S. Pat. No. 4,040,328 to Muenchinger. This patent provides a tapered point zone on the fastener with stabilizing threads that have a higher out-of-round than the fastener body. However, the out-of-round of the stabilizing threads is, in fact, significantly greater than that of the full-forming thread. This is a less efficient structure, since the stabilizing and thread-forming threads are tasked with virtually all the forming work, while the first full-diameter thread has the lower out-of-round cross section, which is inefficient for thread forming purposes.

It is therefore an object of this invention to provide a fastener blank, and underlying threaded fastener formed therefrom, that exhibits reasonably low thread-forming torque, while maintaining good resistance to failure, once it is in engagement within a nut-member or other thread-formed hole.

SUMMARY OF THE INVENTION

This invention overcomes the disadvantages of the prior art by providing a self-tapping fastener formed from a blank having a cross section that defines a series of lobes, and that has an additional thread-forming section between the lobed tapered thread-forming section and the full-diameter lobed main body of the blank. This additional thread forming section is also substantially full-diameter and exhibits cross sectional lobes with a higher out-of-round than those of the main body blank/threads. The additional thread-forming section has an axial length of approximately one thread pitch, thereby providing one additional high-out-of-round full-diameter thread forward of (in a head-to-tip direction) the main body threads. The lobes of the additional thread-forming thread are located at the full diameter, like the adjacent main body threads, but have a higher contact pressure due to less material in contact with the internal threads being formed. As such the additional full-diameter thread-forming thread applies more thread-forming pressure than would be applied by a conventional main body thread at the same axial position.

In an alternate embodiment, the blank can include the above-described higher out-of-round section on a blank that includes a tapered section, but no substantial stabilizing section forward thereof. In each of the above embodiments, the additional thread-forming section has an out-of-round defined by the out-of-round factor K (further defined hereinbelow) equal to approximately 0.2–0.3 times the relative thread pitch while the out-of-round of the main body threads is maintained at a factor K approximately 0.05–0.15 times the relative pitch.

A blank having the above-described thread forming and main body sections can be formed to selectively include either a stabilizing section or a tip that begins at the tapered section by providing a blank-forming header die with a knock-out pin in which the knock-out pin can be positioned to occupy or reveal part of a forming die cavity therein that conforms to the size and shape of the stabilizing section.

BRIEF DESCRIPTION OF THE DRAWINGS

The foregoing and other objects and advantages of the invention will become more clear with reference to the following detailed description as illustrated by the drawings in which.

DETAILED DESCRIPTION

Figure 6:
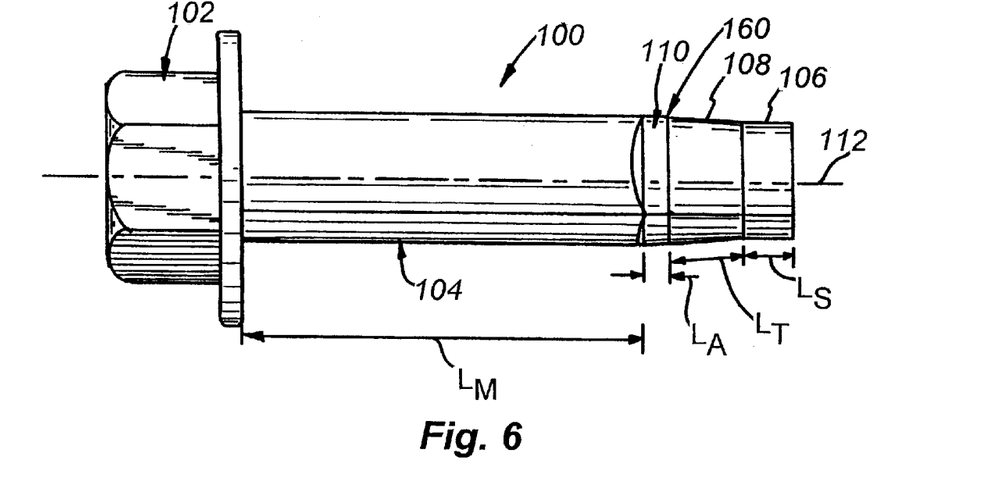
FIG. 6 is a side view of a self-tapping roll-forming fastener blank according to this invention.

FIG. 6 illustrates a fastener blank according to a preferred embodiment of this invention. The blank 100 includes a drive head 102 having any desired shape. As described above, the head has been formed on the blank using header punches or another acceptable method. The blank 100 is formed from a hardenable metal such as low-medium carbon steel. Final hardening is typically accomplished in the form of heat treating, case hardening, magnetic induction hardening, nitride coating and the like after final thread formation on the blank has occurred.

The blank in this embodiment includes three discrete lobes like those shown with reference to FIGS. 1–5. In general, more lobes can be used. It has been found, however, that three lobes are acceptable. When more lobes are used, it is preferable that an odd number of lobes be present.

The blank 100 includes a main body 104, a stabilizing section 106, a tapered thread-forming section 108 and a unique additional thread-forming section 110. The length of each section, 104, 106, 108 and 110 (LM, LS, LT and LA, respectively) of the blank is herein defined in terms of the number of standard pitch lengths that can be applied to the respective fastener blank section as it is formed.

By way of background, a lobular fastener can be formed in accordance with the teachings of Phipard, Jr., U.S. Pat. No. 3,918,345, incorporated herein by reference (see, for example, FIG. 5 therein) using a pair of forming dies that are moved in predetermined opposite directions in which a headed blank is passed therebetween. The forming dies include linear grooves that conform to thread shapes and are set at an appropriate pitch spacing from each other. Typically, the forming dies define curved or angled/inclined surfaces that taper toward each other near the tip of the blank (opposite the head), conforming with the tapered thread-forming and stabilizing zone of the associated blank. During formation, the dies are first brought into compressive, permanently deforming contact with the blank, one die contacting a lobe, and the other contacting an opposing valley on the three-lobe, three-valley blank. The threads are pressed into the contact points at this time. As a moving die passes by a stationary die, the blank is rotated between them with its center axis 112 defining an oscillating path. This oscillation corresponds to the rotation of the blank about its lobes. The dies maintain a constant spacing as they move, forming a thread pattern of predetermined depth (based upon the degree of die separation) on the blank surface. Note that, during fastener manufacture, a slight degree of thread underfill/overfill may exist given the symmetrical spacing of the dies. This underfill/overfill, which occurs primarily in the stabilizing and thread forming sections of the fastener, does not appreciably affect the performance of the fastener.

Figure 7:
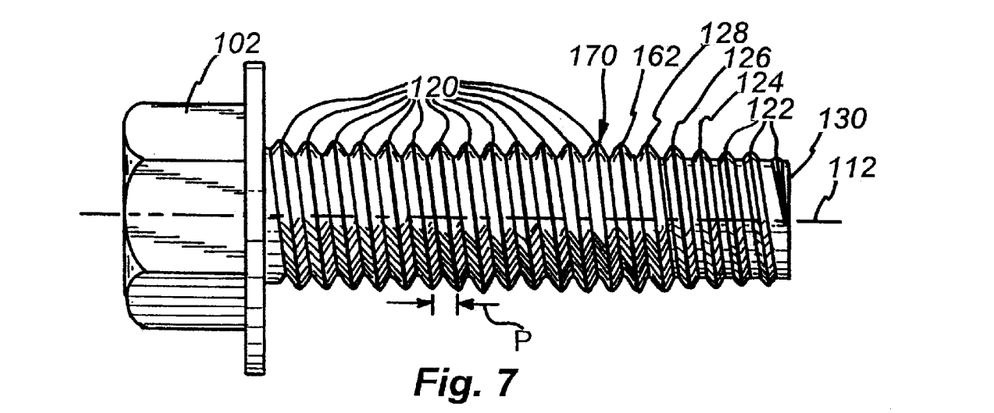
FIG. 7 is a side view of an exemplary thread pattern formed on the fastener blank of FIG. 6.
Figure 10:
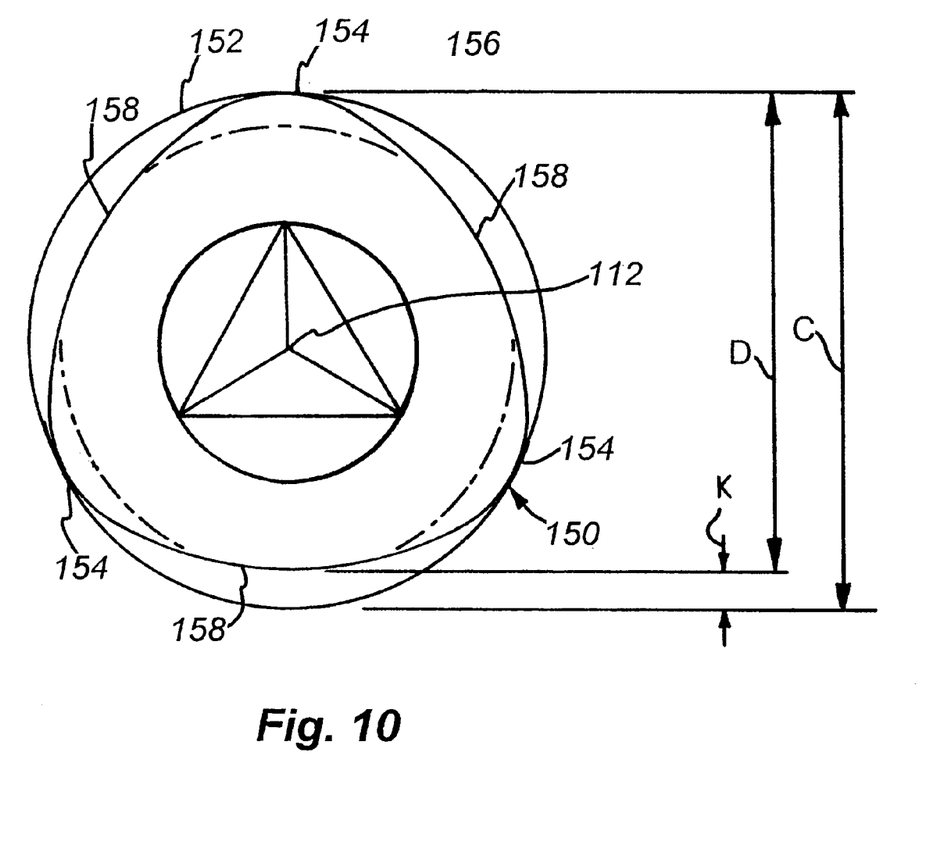
FIG. 10 is a cross section of a typical fastener blank, illustrating a system for measuring out-of-round.

The finished fastener which is shown in FIG. 7 including threads will include a set of main body threads 120 that are substantially even in pitch and diameter. The stabilizing threads 122, which are typically 1½–3 pitches in length (length LS), are smaller in diameter. The thread-forming threads 124, 126 and 128, shown here as three distinct threads that each increase in diameter in conformance with the increasing in diameter of the taper from the front end 130 of the fastener to the head 102. Typically, two-three forming threads are provided in this embodiment (length LT). In an alternate embodiment, three-four forming threads (or more) are provided. As noted above, the stabilizing and thread-forming blank sections 106 and 108, respectively, and the corresponding threads 122, 124, 126 and 128 define and out-of-round that is greater than that of the main body 104 and its threads 120. This is, as noted above, desired to reduce the thread-forming torque required when the fastener is driven into an unthreaded pilot hole. With reference again to Phipard, Jr. '345, a technique for defining out-of-round in a multi-lobe fastener blank is described. This measurement technique is detailed generally in FIG. 10. The cross-sectional outline 150 of the blank corresponds to an odd-numbered polygon. In this case it is a triangle. The triangle is circumscribed about the central axis 112. The individual curved segments that make up the outline 150 are particularly defined according to known conventions described, for example, in the Phipard patents noted above. Definitions of the outline shape are also available in a variety of literature related to TRILOBULAR™ fasteners available from Research Engineering and Manufacturing, Inc. of Middletown, R.I. A circle 152 is shown circumscribing each apex or corner 154 of the outline 150. This is a circle of maximum diameter for the blank. It is centered about the axis 112. Another circle 156, also centered about the axis 112 contacts the most inwardly located valley 158 of the outline 150 with respect to the axis 112. The diameter of the outer circle 152 is denoted as C. The distance between an apex 154 and an opposing valley 158 is denoted as D. The difference between C and D is denoted as the dimension value K. K is, in essence, the magnitude of the out-of-round inherent in a given blank cross section.

Referring again to FIGS. 6 and 7 the main body is provided with a dimension K that is relatively low, being 0.05–0.15 times the relative thread pitch P conversely, the out-of-round of the thread-forming section 108, and associated threads 124, 126 and 128 is defined by a K approximately 0.20–0.30 times the thread pitch P. According to this embodiment, the additional thread-forming section 110, which has an axial length LA of approximately one pitch length (P) maintains the out-of-round dimension of the adjacent portion 160 of the tapered thread-forming section 108. In other words, a thread 162 is defined on the section 110 that has a relatively high out-of-round or K equal to 0.20–0.30 times the pitch P of the fastener thread. It is expressly contemplated, however that, the section 110 can have an axial length sufficient to accommodate two or more full-diameter thread-forming threads thereon, according to an alternate embodiment of this invention. The diameter of the lobes of this thread are substantially the same as those of the adjacent main body threads. Hence the zone 110 presents a full-diameter forming profile to the internal threads, but does so at a higher pressure, since less area on each lobe of the thread 162 in additional zone 110 is in contact with the internal thread. Of course there may be slight variations in diameter between the thread 162 and the main body threads 120, but the thread is sufficiently close in diameter to be termed a full-diameter thread with respect to the full diameter main body threads 120. The next adjacent thread 170 among the main body threads 120 drops in out-of-round abruptly to have a K equal to 0.05–0.15 in this embodiment. By providing an additional thread 162 having the above-described high out-of-round, with an outer diameter that is essentially the same as the remainder of the main body threads 120, the torque necessary to form a thread in a pilot hole is substantially reduced. Rather than having the thread-forming zone transition immediately into a low out-of-round main body zone, the thread 162 acts as a full diameter transition thread that still maintains a high contact pressure for final formation of threads at full diameter. Hence, when the main body threads 120 finally reach the newly formed internal threads of the pilot hole, they should not be required to exert substantial formation pressure themselves.

Figure 8:
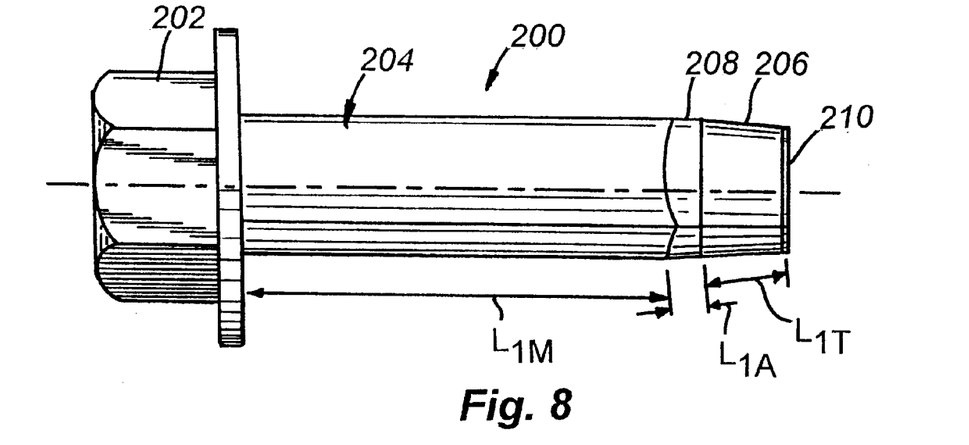
FIG. 8 is a side view of a self-tapping roll-forming fastener blank according to an alternate embodiment of this invention.
Figure 9:
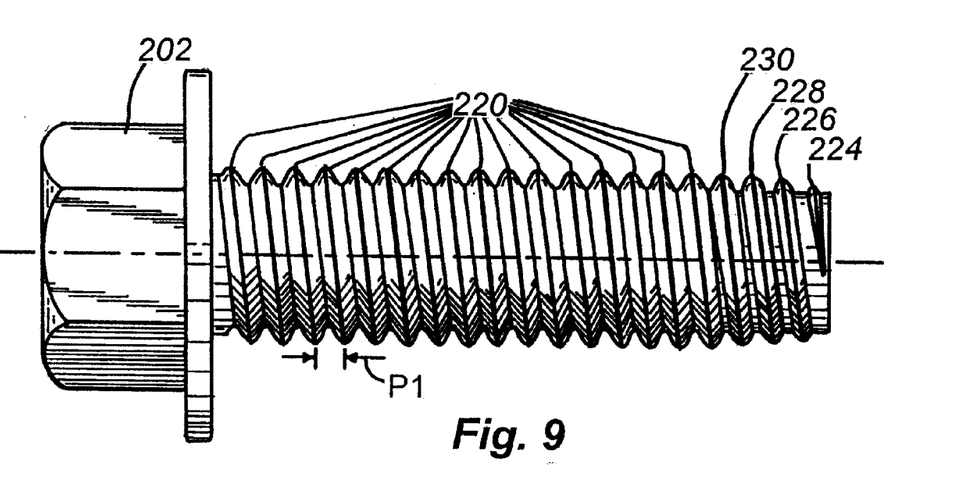
FIG. 9 is a side view of an exemplary thread pattern formed on the blank of FIG. 8.

Reference is now made to FIGS. 8 and 9 which show a fastener blank and resulting threaded fastener according to alternate embodiment. Unlike the embodiment shown in FIGS. 6 and 7, the embodiment detailed in FIGS. 8 and 9 does not include a stabilizing section. In some applications, a stabilizing section is not necessary or desired. FIG. 8, particularly, shows a fastener blank 200 having a formed head 202 thereon of an appropriate shape and size. The blank includes a main body 204 having a length L1M also detailed is a tapered thread-forming section 206 having a length L1T and an additional section 208 disposed axially between the tapered thread-forming section 206 and main body section 204. The additional section has a length L1A. A relatively small tip portion 210 (usually 0.010–0.015 inch in axial length) is also depicted. This is excess material displaced during the tip formation process in the header die and is not significant to the structure defined herein as described above. In particular, the tip often serves as a witness mark that indicates whether the full section of the header die has been filled out during blank manufacture. The axial length of the main body 204 varies depending upon the desired length of the fastener. As shown in FIG. 9, a series of main body threads 220 are defined on the main body using the thread die-forming process described above. The out-of-round K for these threads is approximately 0.05–0.15 times the pitch P1. Three diametrically increasing thread-forming threads 224, 226 and 228 are also formed. Their out-of-round, as defined above, is a K equal to 0.20–0.30 times P1. The length L1T of the tapered thread-forming section is sufficient to provide approximately three threads thereon. Finally, the additional thread-forming thread 230 formed on the additional section 208 has the high out-of-round K equal to 0.20–0.30 times P1, and provides the full-diameter thread-forming transition into the main body threads. The additional section length L1A, is, of course, sufficient to provide one thread pitch at minimum.

Figure 5:
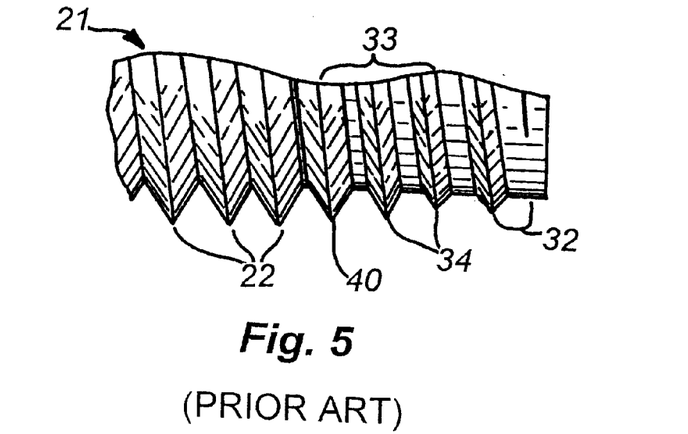
FIG. 5, already described, is a more detailed view of the stabilizing and thread-forming sections of the fastener of FIG. 4.
Figure 11:
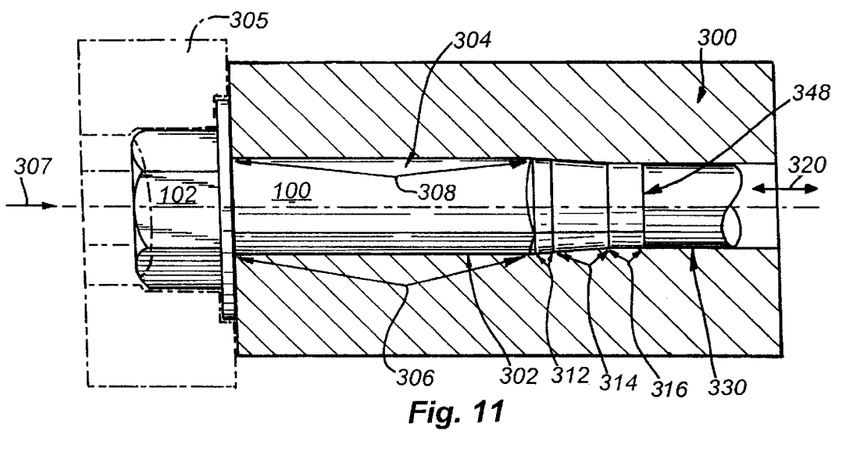
FIG. 11 is a cross section of a header die arrangement for producing a blank according to one embodiment of this invention.

The formation of a finished blank (100) detailed in FIGS. 5 and 6 can be accomplished according to FIG. 11. A hard header die 300 is shown. It defines a forming die cavity 302, into which a cut-off piece of wire or rod 304 of predetermined size is placed. The die cavity 302 is a dimensioned hole that conforms to the desired finished blank shape. The die cavity 302 has sidewalls of sufficient thickness and hardness to ensure that no deformation of the die cavity 302 will occur as a piece of wire or rod is driven thereinto to be plastically deformed into the blank shape. The cross section of the die cavity 302 (not shown), of course, defines three or more lobes as described above. The wire or rod section used to form the blank can also include three or more conforming lobes. The wire or rod typically has a cross section that conforms to the desired main body shape so further forming of this main body portion of the blank is minimal. In general, the die 300 is formed according to conventional techniques, using known materials and dimensional sizing for sidewall thickness, etc..

Formation of a finished fastener blank often occurs in several strikes applied by a ram or punches 305 (shown in phantom). The punches are typically driven by a powerful mechanical actuator (not shown) that strikes the blank under great pressure (see arrow 307) to cause both the blank head and internal blank shape to be formed simultaneously. Several differently shaped punches and/or header dies can be used during formation of the blank and blank head, each with a shape that conforms progressively more closely to that of the finished blank drive head 102. In this example, that drive head 102 defines a conventional hex washer head shape as shown above. The punches used herein are considered conventional.

Figure 12:
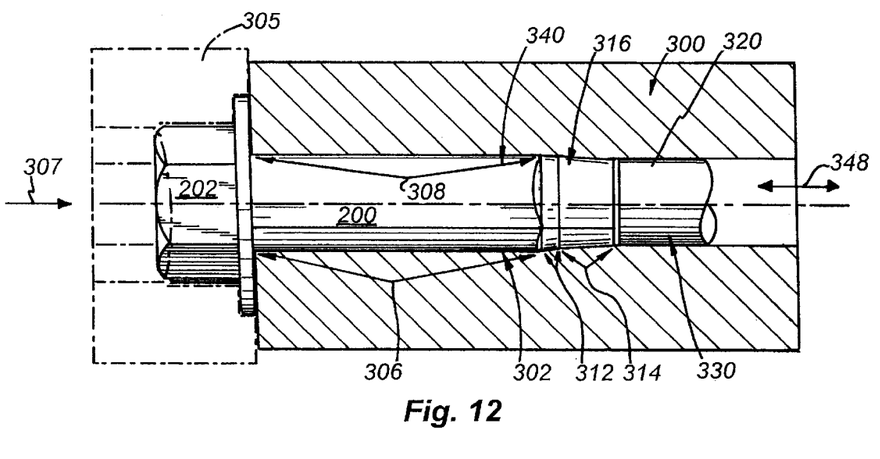
FIG. 12 is a cross section of the header die arrangement of FIG. 11 for producing a blank according to an alternate embodiment of the invention.

The die cavity 302 defines the distinct shapes of the blank sections according to each of the embodiments of this invention. The die cavity 302 defines a series of shaped sections that form the respective sections of the finished fastener blank through plastic deformation as the initial rod or wire is driven into the die cavity by the punch 305. The sections each define a multi-lobed cross section having the desired out-of-round configuration as discussed above. The die cavity sections include an elongated main body die cavity section 306 for enclosing the blank's corresponding main body adjacent the opening of the die cavity. The neighboring full-diameter, high out-of-round thread forming section 312 having a high out-of round is located inwardly of the main body die cavity is section 306. Likewise, the tapered thread forming die cavity section 312 and stabilizing section die cavity section 316 are each located further inwardly, respectively. During the forming process, the rod or wire is seated inwardly as far as it can go. It typically seats onto the front of the full-diameter thread forming section 312. Each strike of the punch or punches, causes the rod or wire tip to deform into the next forward section as it is driven further into the die cavity. The knock-out pin acts as a stop to prevent further inward movement of the blank into the die cavity 302. This pin is formed from a hardened material according to known processes. It can move axially inwardly and outwardly (double arrow 348) under the force of a mechanical actuator (not shown) of known design. The pin mechanism can be locked into position (not shown) so as to maintain its position firmly when it is acting as a stop as shown in FIGS. 11 and 12. When the blank is to be removed from the die cavity 302, the knock out pin is moved toward the cavity front opening a sufficient distance to eject the blank. The blank can then be transferred by know techniques to another cavity for further forming or to a threading mechanism or machine for forming of the threads.

FIG. 12 details the die 300 configured to form a blank (200) according to the embodiment detailed in FIGS. 8 and 9. This blank is substantially similar in size and shape to the blank (100) described above. However, it omits a stabilizing section at its front. As described above, the knock-out pin can be selectively moved (double arrow 348) toward and away from the front opening of the die cavity 302. Hence, the knock out pin can be moved by its actuator to selectively occupy the area of the stabilization section die cavity 316. The pin 330 typically has a cross section that matches that of this section. This when it moves toward the cavity front opening its is not blocked by the larger diameter sections 300, 312 and 314. To create a blank 100 according to FIGS. 6, 7 and 11, the knock-out pin is positioned approximately 1½–3 pitch lengths forwardly of the tapered thread forming section 314. This allows the front tip of the rod or wire 340 to be driven fully into the stabilizing die cavity section 316. Conversely, when the section 316 is occupied by the knock-out pin 330, its front face 320 provides a stop that prevents the stabilizing section from being formed, creating the alternate finished blank (200). The knock-out pin 330 can be moved to each of these alternate positions (FIG. 11 or FIG. 12). Appropriate locking mechanisms can be provided to secure the pin 330 in either of the stop positions described above.

The foregoing has been a detailed description of preferred embodiments of the invention. Various modifications and additions can be made without departing from the spirit and scope of this invention. For example, the blank can include further forming and stabilizing sections, in addition to the full-diameter forming section detailed herein. A variety of other forming techniques can be used to form blanks, drive heads and thread patterns including fully enveloping dies, cutting tools or rolling dies. The thread profile depicted herein is of a conventional triangular/straight-line configuration. It is expressly contemplated that a blank according to this invention can be provided with any kind of thread profile including a curved/radius profile, a cupped profile or a square/Acme profile. In addition, while a range of K factors for out-of-round are specified hereinabove for various blank sections, it is expressly contemplated that these values can be varied for applications having particular size, shape and material requirements. The exact K factor can be determined for such an application using empirical data based upon physical tests and experiments on fasteners formed with a given set of properties. Accordingly, this description is meant to be taken only by way of example, and not to otherwise limit the scope of the invention.

What is claimed is:

1. A threaded fastener having a cross section, taken through an axis, that defines at least three lobes and three valleys therebetween, the lobes having a lobe maximum diameter with respect to the axis and the valleys having a valley maximum diameter with respect to the axis, the lobe maximum diameter being larger than the valley maximum diameter, and a relationship therebetween being defined by an out-of round dimension, the threaded fastener comprising:

a main body section extending in an axial direction from a drive head toward a tip, the main body section having main body valleys with a main body valley maximum diameter and main body lobes with a main body lobe maximum diameter and defining therebetween a main body section out-of-round dimension;

a tapered thread-forming section located forward, taken in the axial direction toward the tip, of the main body section, the tapered thread-forming section having, at each axial point therealong, tapered thread-forming section valleys with a tapered thread-forming valley maximum diameter and tapered thread-forming valley lobes with a tapered thread-forming lobe maximum diameter and defining therebetween a tapered thread-forming section out-of-round dimension, the main body section out-of round dimension being lower than the tapered thread-forming section out-of-round dimension; and a full-diameter thread-forming section located axially between the main body section and the tapered thread-forming section, the full diameter thread forming section having full-diameter thread-forming section valleys with a full-diameter thread-forming valley maximum diameter and full-diameter thread-forming valley lobes with a full-diameter thread-forming lobe maximum diameter and defining therebetween a full-diameter thread-forming section out-of-round dimension, wherein the full-diameter thread-forming lobe maximum diameter is approximately equal to the main body lobe maximum diameter and the full-diameter thread-forming out-of-round dimension is higher than the main body out-of-round dimension, whereby the lobes of the full-diameter thread-forming section exerts a higher thread-forming pressure than the lobes of the main body section.

2. The fastener as set forth in claim 1 wherein the fastener includes threads having a pitch P and wherein the out-of-round of the full-diameter thread forming section is defined by a factor K approximately equal to 0.20–0.30 times P, based upon a difference between a radial length of thread forming section valleys and thread forming section lobes, with respect to an axis of the fastener.

3. The fastener as set forth in claim 1 further comprising a stabilizing section having stabilizing section lobes with a smaller stabilizing lobe maximum diameter than the main body lobe maximum diameter located axially forward of the tapered thread-forming section.

4. The fastener as set forth in claim 3 wherein the stabilizing section has a maximum length sufficient for approximately two threads having a predetermined size to be located thereon.

5. The fastener as set forth in claim 1 wherein the full-diameter thread-forming section out-of-round dimension is approximately equal to the tapered thread-forming section out-of-round dimension located directly adjacent thereto.

6. The fastener as set forth in claim 1 wherein the full-diameter thread-forming section has an axial length at least long enough to locate one thread pitch of predetermined size and shape thereon.

7. The fastener as set forth in claim 6 wherein the blank is constructed and arranged to receive threads having a pitch P and wherein the out-of-round of the full-diameter thread forming section is defined by a factor K approximately equal to 0.20–0.30 times P, based upon a difference between a radial length of thread forming section valleys and thread forming section lobes, with respect to an axis of the blank.

* * * * *